US007639494B2

(12) United States Patent
Lin

(10) Patent No.: US 7,639,494 B2
(45) Date of Patent: Dec. 29, 2009

(54) ELECTRONIC APPARATUS

(75) Inventor: Jin-Jen Lin, Taipei (TW)

(73) Assignee: Inventec Corporation, Taipei (TW)

( * ) Notice: Subject to any disclaimer, the term of this patent is extended or adjusted under 35 U.S.C. 154(b) by 190 days.

(21) Appl. No.: 12/021,861

(22) Filed: Jan. 29, 2008

(65) Prior Publication Data

US 2009/0050027 A1    Feb. 26, 2009

(30) Foreign Application Priority Data

Aug. 23, 2007  (TW) .............................. 96131223 A

(51) Int. Cl.
*G06F 1/16* (2006.01)
(52) U.S. Cl. .................. 361/679.55; 439/326; 324/762; 340/573.1
(58) Field of Classification Search ............ 439/78, 439/79, 131, 326; 324/149, 726, 72.5; 340/5.31, 340/573.1; 292/216; 604/208; 348/836; 62/259.1; 361/679.06, 679.08, 679.27, 679.32, 361/679.43
See application file for complete search history.

(56) References Cited

U.S. PATENT DOCUMENTS

| | | | | |
|---|---|---|---|---|
| 2005/0082843 | A1* | 4/2005 | Edgar | 292/216 |
| 2006/0258990 | A1* | 11/2006 | Weber | 604/208 |
| 2007/0058092 | A1* | 3/2007 | Ryu | 348/836 |

* cited by examiner

*Primary Examiner*—Hung V Duong
(74) *Attorney, Agent, or Firm*—J.C. Patents

(57) ABSTRACT

An electronic apparatus includes a first machine assembly, a second machine assembly having a pushing part and a first locking part, and a connection mechanism. The connection mechanism connecting the first and the second machine assemblies includes a body, a driven element having a second locking part and a third locking part, and a fourth locking part disposed on the body. Two ends of the body are pivoted to the first assembly and the second assembly respectively. The driven element is movably disposed on the body. When the second assembly is at a first position and the connection mechanism is at a second position, the second assembly is located above the first assembly, the pushing part and the first locking part are far from the connection mechanism, and the fourth locking part locks the third locking part to restrict the relative movement between the driven element and the body.

16 Claims, 12 Drawing Sheets

ELECTRONIC APPARATUS

CROSS-REFERENCE TO RELATED APPLICATION

This application claims the priority benefit of Taiwan application Ser. No. 96131223, filed on Aug. 23, 2007. The entirety of the above-mentioned patent application is hereby incorporated by reference herein and made a part of this specification.

BACKGROUND OF THE INVENTION

1. Field of the Invention

The present invention generally relates to an electronic apparatus, and more particularly, to an electronic apparatus having a connection mechanism.

2. Description of Related Art

The most significant difference between a portable computer and a traditional desktop lies in that a portable computer is light, slim, short and small so as to be easily carried by a user and the user can use the portable computer in various working circumstances.

In a portable computer with a 15" or 17" display, when the user unfolds the display to an opening angle, a host of the portable computer is stably disposed on a carrying surface. However, since the size of the display of the portable computer tends to increase and the weight of the display tends to increase, the opening angle tends to be restricted. Otherwise, the host is not stably disposed on the carrying surface such that the portable computer is over-turned.

SUMMARY OF THE INVENTION

The present invention is directed to an electronic apparatus capable of being stably disposed on a carrying surface during use.

The present invention provides an electronic apparatus, which includes a first machine assembly, a second machine assembly and a connection mechanism. The second machine assembly has a pushing part and a first locking part. The connection mechanism connects the first machine assembly and the second machine assembly and includes a body, a driven element having a second locking part and a third locking part, and a fourth locking part disposed on the body. An end of the body is pivoted to the first machine assembly, and another end thereof is pivoted to the second machine assembly. The driven element is movably disposed on the body. When the second machine assembly is located at a first position and the connection mechanism is located at a second position, the second machine assembly is located above the first machine assembly, the pushing part and the first locking part are far from the connection mechanism and the fourth locking part locks the third locking part to restrict the relative movement between the driven element and the body.

In an embodiment of the present invention, when the second machine assembly rotates relatively to the connection mechanism from the first position to the second position, the pushing part passes through the body to interfere the connection mechanism so that the third locking part does not lock the fourth locking part.

In an embodiment of the present invention, when the second machine assembly and the connection mechanism together rotate relatively to the first machine assembly from the second position to a third position, the driven element moves relatively to the body and the second locking part locks the first locking part.

In an embodiment of the present invention, the above-mentioned connection mechanism includes an eccentric element fixed to the first machine assembly. The body is pivoted to the eccentric element and suitable for rotating relatively to the eccentric element about a first axis. An end of the driven element is pivoted to the eccentric element and the driven element is suitable for rotating relatively to the eccentric element about a second axis. The first axis is parallel to the second axis. When the second machine assembly and the connection mechanism together rotate relatively to the first machine assembly from the second position to the third position, the eccentric element drives the driven element so that the driven element rotates relatively to the eccentric element and moves relatively to the body, and the second locking part locks the first locking part.

In an embodiment of the present invention, the above-mentioned connection mechanism includes a first pivot and a second pivot. The first pivot passes through the eccentric element and the body. The eccentric element is fixed to the first pivot, the first pivot is fixed to the first machine assembly, and the first axis passes through the first pivot. The second pivot passes through the eccentric element and the driven element. The second pivot is fixed to eccentric element, and the second axis passes through the second pivot.

In an embodiment of the present invention, the above-mentioned driven element includes a first driven part, a second driven part and a torsion spring. The first driven part has the second locking part and an end of the first driven part is pivoted to the eccentric element. The second driven part has the third locking part and the second driven part is pivoted to another end of the first driven part far from the second axis. The torsion spring is pivotally disposed at the first driven part and exerts a torque relatively to the first driven part on the second driven part. When the second machine assembly rotates relatively to the connection mechanism from the first position to the second position, the pushing part passes through the body to push the second driven part, and the second driven part rotates relatively to the first driven part against the direction of the torque such that the third locking part does not lock the fourth locking part.

In an embodiment of the present invention, the above-mentioned first locking part and the second locking part may respectively have a hook and a locking hole.

In an embodiment of the present invention, the above-mentioned connection mechanism further includes an elastic element elastically disposed between the fourth locking part and the body. When the second machine assembly rotates relatively to the connection mechanism from the first position to the second position, the pushing part passes through the body and the fourth locking part to push the fourth locking part so that the third locking part does not lock the fourth locking part.

In an embodiment of the present invention, when the connection mechanism is located at the second position, an included angle between the connection mechanism and the first machine assembly ranges between 70° and 90°.

In an embodiment of the present invention, the above-mentioned fourth locking part may have a protrusion and the third locking part may have a locking hole.

The present invention provides an electronic apparatus, which includes a first machine assembly, a second machine assembly and a connection mechanism. The second machine assembly has a pushing part and a first locking part. The connection mechanism connects the first machine assembly and the second machine assembly and includes a body, a driven element having a second locking part and a third locking part, and a fourth locking part disposed on the body. An end of the body is pivoted to the first machine assembly, and another end thereof is pivoted to the second machine assembly. The driven element is movably disposed on the body. When the second machine assembly and the connection mechanism are together located at a first position, the first locking part locks the second locking part and the pushing part passes through the body to interfere the connection mechanism so that the third locking part does not lock the fourth locking part. When the second machine assembly and the connection mechanism together rotate relatively to the first machine assembly from the first position to a second position, the driven element moves relatively to the body and the second locking part does not lock the first locking part.

In an embodiment of the present invention, the above-mentioned connection mechanism includes an eccentric element fixed to the first machine assembly. The body is pivoted to the eccentric element and suitable for rotating relatively to the eccentric element about a first axis. An end of the driven element is pivoted to the eccentric element and the driven element is suitable for rotating relatively to the eccentric element about a second axis. The first axis is parallel to the second axis. When the second machine assembly and the connection mechanism together rotate relatively to the first machine assembly from the first position to the second position, the eccentric element drives the driven element so that the driven element rotates relatively to the eccentric element and moves relatively to the body and the second locking part does not lock the first locking part.

In an embodiment of the present invention, the above-mentioned connection mechanism includes a first pivot and a second pivot. The first pivot passes through the eccentric element and the body. The eccentric element is fixed to the first pivot, the first pivot is fixed to the first machine assembly, and the first axis passes through the first pivot. The second pivot passes through the eccentric element and the driven element. The second pivot is fixed to eccentric element, and the second axis passes through the second pivot.

In an embodiment of the present invention, the above-mentioned first locking part and the second locking part may respectively have a hook and a locking hole.

In an embodiment of the present invention, when the connection mechanism is located at the second position, an included angle between the connection mechanism and the first machine assembly ranges between 70° and 90°.

The present invention provides an electronic apparatus, which includes a first machine assembly, a second machine assembly and a connection mechanism. The second machine assembly has a first locking part. The connection mechanism connects the first machine assembly and the second machine assembly and includes a second locking part. The second machine assembly is pivoted to the connection mechanism and the connection mechanism is pivoted to the first machine assembly. When the second machine assembly and the connection mechanism are together located at a first position, the first locking part locks the second locking part. When the second machine assembly and the connection mechanism together rotate relatively to the first machine assembly from the first position to a second position, second locking part does not lock the first locking part.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The First Embodiment

Figure 1A:
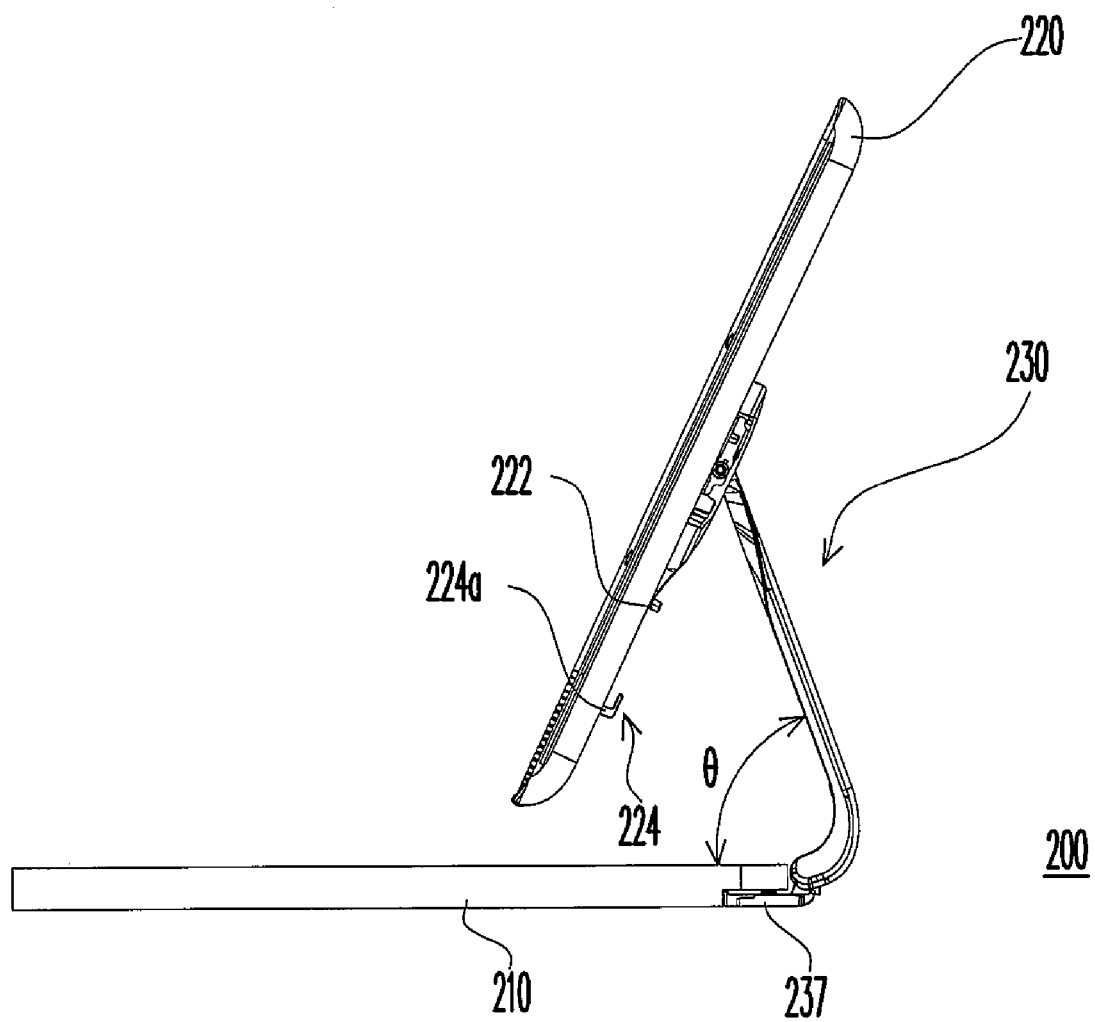
FIGS. 1A-1C are schematic side views of an electronic apparatus acting from the operation state to the folding state according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
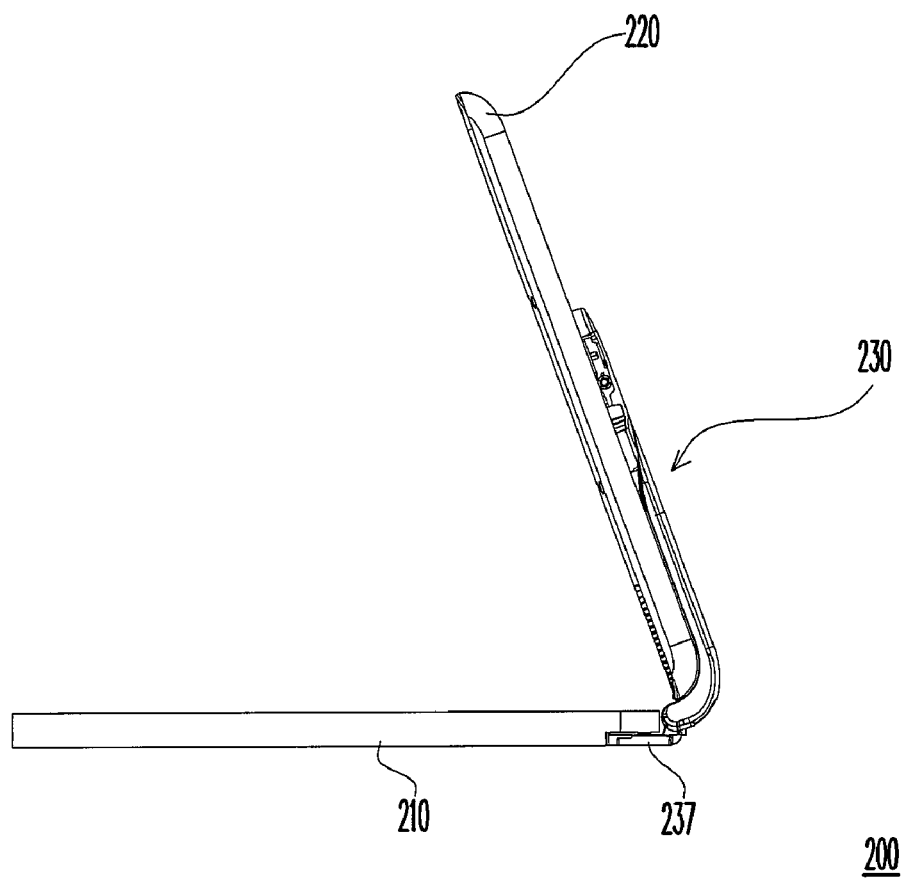
Figure 1C:
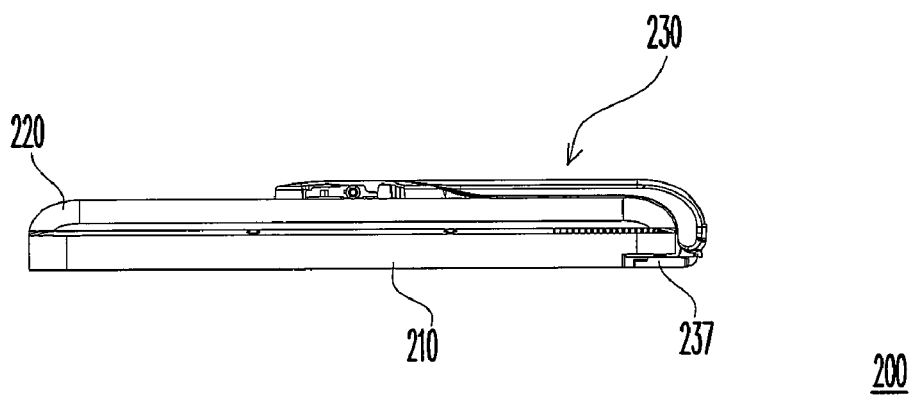
Figure 2A:
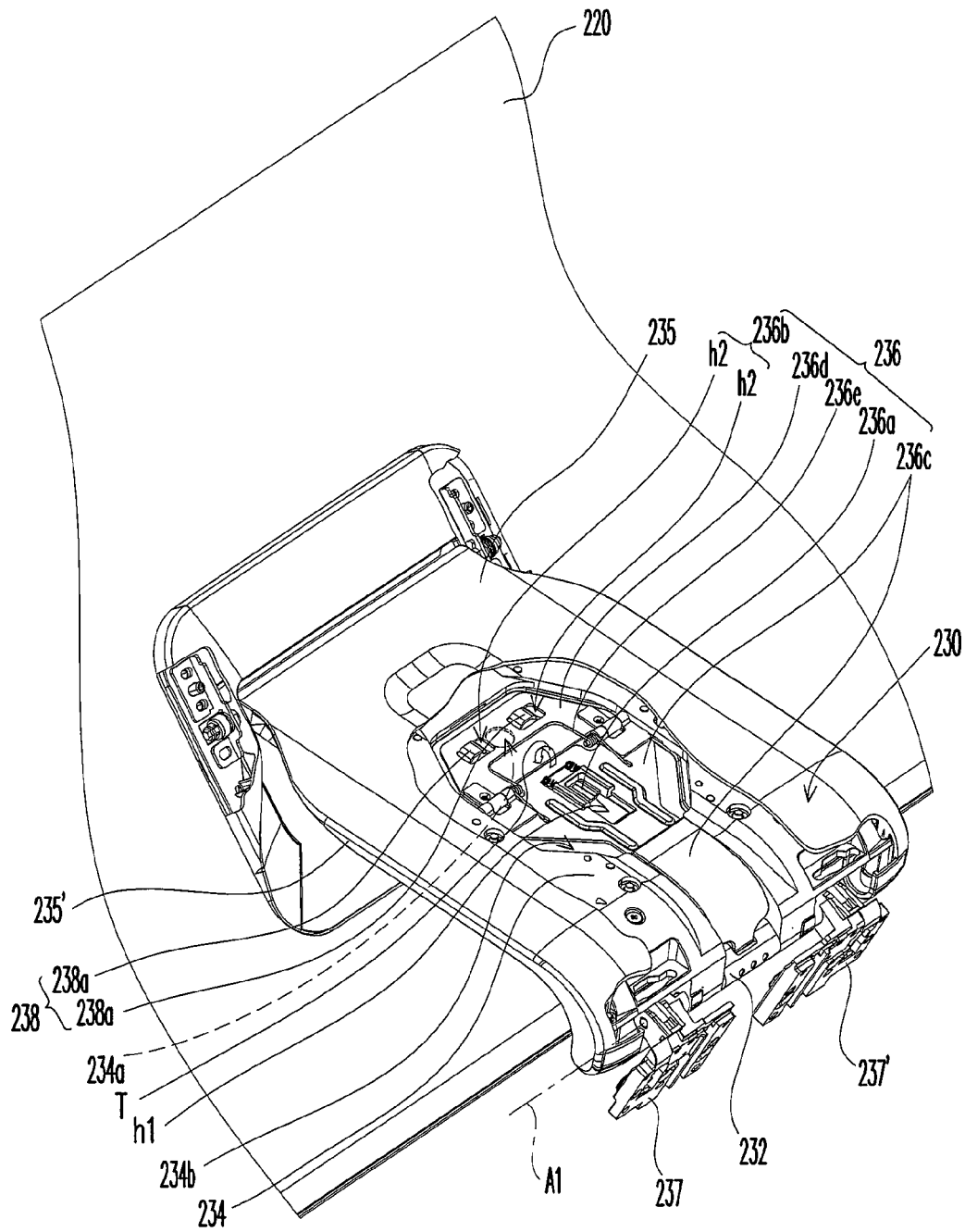
FIGS. 2A-2C are 3-D diagrams of the connection mechanism corresponding to the action of FIGS. 1A-1C, respectively.
Figure 2B:
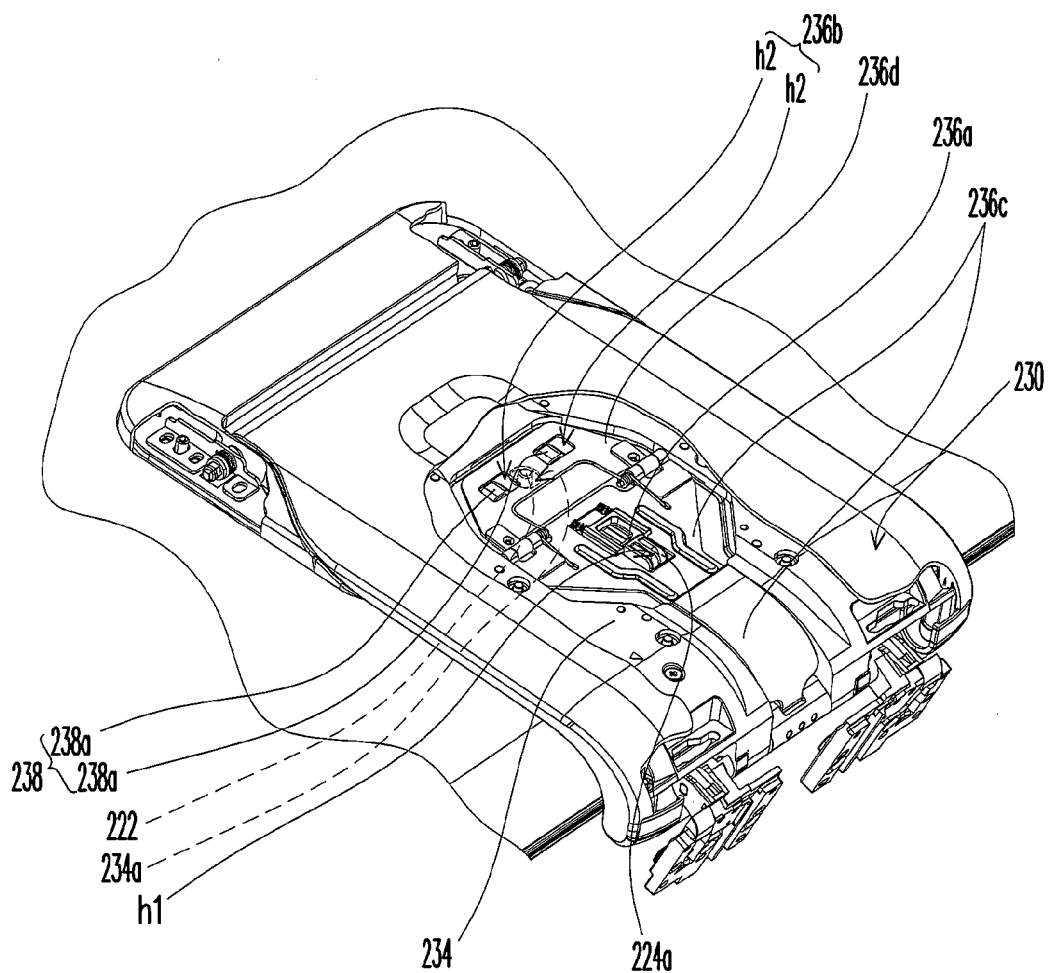
Figure 2C:
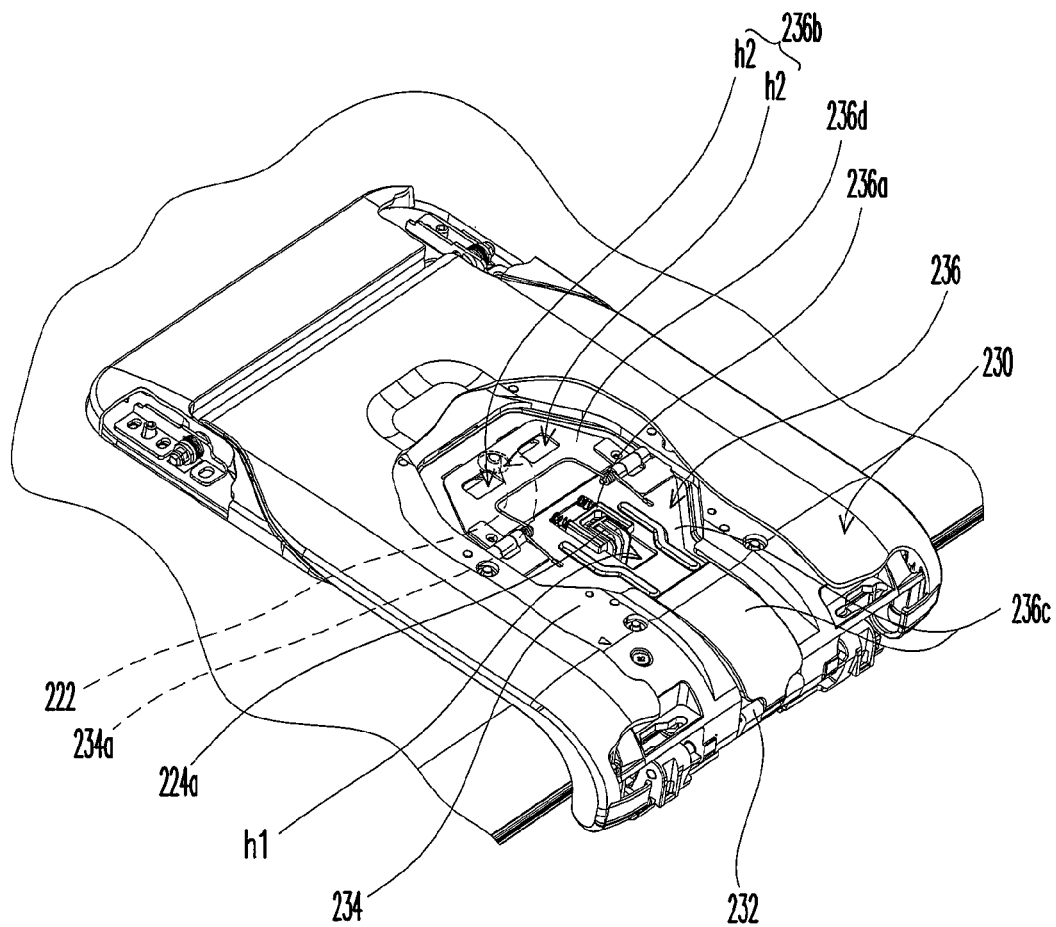
Figure 3:
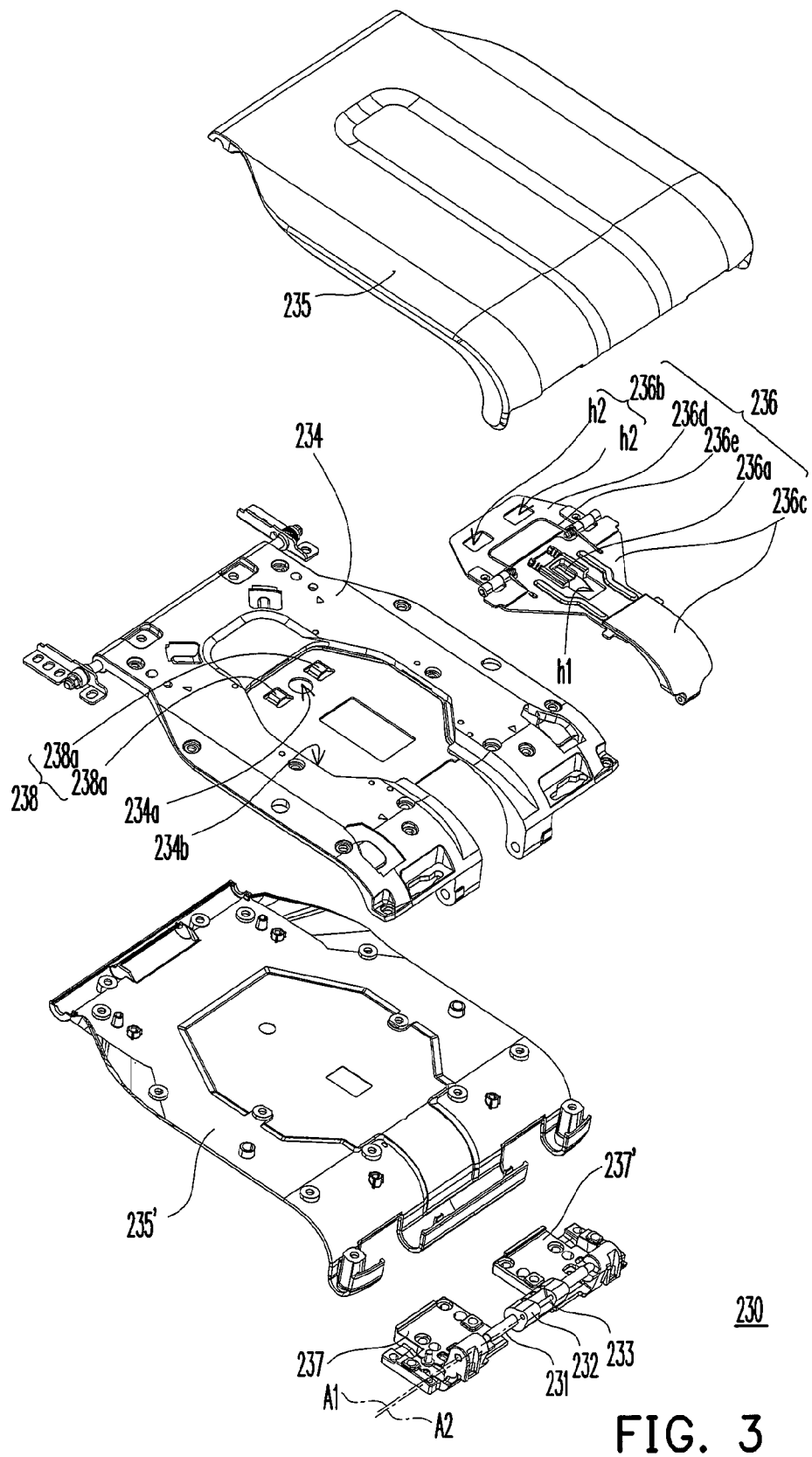
FIG. 3 is a 3-D exploded diagram showing the partial connection mechanism of FIG. 1A.

FIGS. 1A-1C are schematic side views of an electronic apparatus acting from the operation state to the folding state according to a first embodiment of the present invention. FIGS. 2A-2C are 3-D diagrams of the connection mechanism corresponding to the action of FIGS. 1A-1C, respectively. FIG. 3 is a 3-D exploded diagram showing the partial connection mechanism of FIG. 1A. Referring to FIGS. 1A, 2A and 3, an electronic apparatus 200 (for example, a portable computer) in the first embodiment includes a first machine assembly 210 (for example, a host), a second machine assembly 220 (for example, a display) and a connection mechanism 230. The second machine assembly 220 has a pushing part 222 and a first locking part 224. In the embodiment, the pushing part 222 may be a cylinder and the first locking part 224 may have a hook 224a.

The connection mechanism 230 connects the first machine assembly 210 and the second machine assembly 220, and includes an eccentric element 232, a body 234, a driven element 236 and a fourth locking part 238 disposed on the body 234. In the embodiment, the connection mechanism 230 further includes a first pivot 231, a second pivot 233, two casings 235 and 235' and two bases 237 and 237'. The eccentric element 232 is fixed to the first machine assembly 210. The body 234 has a first opening 234a and a cavity 234b. An end of the body 234 is pivoted to the eccentric element 232, and the body 234 is suitable for rotating relatively to the eccentric element 232 about a first axis A1. Another end of the body 234 is pivoted to the second machine assembly 220. In other words, the second machine assembly 220 is able to rotate relatively to the body 234 of the connection mechanism 230, and the body 234 is able to rotate relatively to the eccentric element 232 and the first machine assembly 210.

In the embodiment, the first pivot 231 passes through the eccentric element 232 and the body 234. The eccentric element 232 is fixed to the first pivot 231, the first pivot 231 is fixed to the first machine assembly 210, and the first axis A1 passes through the first pivot 231. In more detail, the eccentric element 232 is fixed to the first pivot 231 by tight fit or riveting. In addition, the first pivot 231 may be fixed to the first machine assembly 210 by using a manner that the first pivot 231 is fixed to the bases 237 and 237' by tight fit and the bases 237 and 237' are tightened at the first machine assembly 210 by screws (not shown).

The driven element 236 has a second locking part 236a and a third locking part 236b. In the embodiment, the second locking part 236a has a locking hole h1, and the third locking part 236b has at least a locking hole h2. Besides, an end of the driven element 236 is pivoted to the eccentric element 232, and the driven element 236 is suitable for rotating relatively to the eccentric element 232 about a second axis A2 parallel to the first axis A1. The driven element 236 is located in the cavity 234b of the body 234 and moves relatively to the body 234. In the embodiment, the body 234 and the driven element 236 are disposed between the casings 235 and 235', and the fourth locking part 238 has at least a protrusion 238a.

In more detail, the driven element 236 of the embodiment includes a first driven part 236c, a second driven part 236d and a torsion spring 236e. The first driven part 236c has the second locking part 236a, and an end of the first driven part 236c is pivoted to the eccentric element 232. The second driven part 236d has the third locking part 236b, and the second driven part 236d is pivoted to another end of the first driven part 236c far from the second axis A2. The torsion spring 236e is pivotally disposed at the first driven part 236c and exerts a torque T relatively to the first driven part 236c on the second driven part 236d. In addition, the second pivot 233 of the embodiment passes through the eccentric element 232 and the first driven part 236c of the driven element 236. The second pivot 233 is fixed to the eccentric element 232 by tight fit. The second axis A2 passes through the second pivot 233.

The action of the electronic apparatus 200 from the operation state to the folding state is explained as follows. First, referring to FIGS. 1A, 2A and 3, when the second machine assembly 220 is located at a first position shown in FIG. 1A and the connection mechanism 230 is located at a second position shown in FIG. 1A (i.e. when the electronic apparatus 200 is in operation state), the second machine assembly 220 is located above the first machine assembly 210, the pushing part 222 and the first locking part 224 are far from the connection mechanism 230, and the fourth locking part 238 locks the third locking part 236b to restrict the relative movement between the driven element 236 and the body 234. In the embodiment, when the second machine assembly 220 is located at the first position and the connection mechanism 230 is located at the second position, the protrusions 238a of the fourth locking part 238 respectively lock the locking holes h2 of the third locking part 236b. In addition, since the torsion spring 236e exerts a torque T relatively to the first driven part 236c on the second driven part 236d, thus, the protrusions 238a tightly lock the locking holes h2, respectively. In addition, when the connection mechanism 230 is located at the second position, an included angle θ between the connection mechanism 230 and the first machine assembly 210 ranges between 70° and 90°.

Note that since the fourth locking part 238 locks the third locking part 236b to restrict the relative movement between the driven element 236 and the body 234, therefore, the second machine assembly 220 is stably disposed above the first machine assembly 210 by means of the connection mechanism 230 when the electronic apparatus 200 is in operation state.

Next, referring to FIGS. 1B, 2B and 3, when the second machine assembly 220 rotates relatively to the connection mechanism 230 from the first position to the second position, the pushing part 222 passes the first opening 234a of the body 234 to interfere the connection mechanism 230 so that the third locking part 236b does not lock the fourth locking part 238. In the embodiment, when the second machine assembly 220 rotates relatively to the connection mechanism 230 from the first position to the second position, the pushing part 222 passes through the casing 235' and the first opening 234a of the body 234 to push the second driven part 236d and the second driven part 236d rotates relatively to the first driven part 236c against the direction of the torque T (shown in FIG. 2A), such that the locking holes h2 of the third locking part 236b do not lock the protrusions 238a of the fourth locking part 238. In addition, the hook 224a of the first locking part 224 (shown in FIG. 1A) passes through the locking hole h1 of the second locking part 236a (shown in FIG. 2A) but does not lock the locking hole h1 of the second locking part 236a.

After that, referring to FIGS. 1C, 2C and 3, when the second machine assembly 220 and the connection mechanism 230 together rotate relatively to the first machine assembly 210 from the second position to a third position shown in FIG. 1C (i.e. when the second machine assembly 220 is folded to the first machine assembly 210), the eccentric element 232 drives the driven element 236 so that the driven element 236 rotate relatively to the eccentric element 232 and move relatively to the body 234 and the second locking part 236a locks the first locking part 224 (shown in FIG. 1A). In the embodiment, when the second machine assembly 220 and the connection mechanism 230 together rotate relatively to the first machine assembly 210 from the second position to the third position, the locking hole h1 of the second locking part 236a locks the hook 224a of the first locking part 224 (shown in FIG. 1A).

The action of the electronic apparatus 200 from the folding state to the operation state is explained as follows. First, referring to FIGS. 1C, 2C and 3, when the second machine assembly 220 and the connection mechanism 230 are together located at the third position shown in FIG. 1C (i.e. when the electronic apparatus 200 is in unfolding state), the locking hole h1 of the second locking part 236a locks the hook 224a of the first locking part 224 (FIG. 1A) and the pushing part 222 passes through the first opening 234a of the body 234 to interfere the connection mechanism 230 so that the locking holes h2 of the third locking part 236b does not lock the protrusions 238a of the fourth locking part 238.

Next, referring to FIGS. 1B, 2B and 3, when the second machine assembly 220 and the connection mechanism 230 together rotate relatively to the first machine assembly 210 from the third position to the second position (shown in FIG. 1B), the driven element 236 moves relatively to the body 234 and the hook 224a of the first locking part 224 (FIG. 1A) passes through the locking hole h1 of the second locking part 236a (FIG. 2A) but does not lock the locking hole h1 of the second locking part 236a.

After that, referring to FIGS. 1A, 2A and 3, when the second machine assembly 220 rotates relatively to the connection mechanism 230 from the second position to the first position shown in FIG. 1A (i.e. the electronic apparatus 200 is in operation state), the second machine assembly 220 is located above the first machine assembly 210, the pushing part 222 and the first locking part 224 are far from the connection mechanism 230 and the protrusions 238a of the fourth locking part 238 correspondingly lock the locking holes h2 of the third locking part 236b to restrict the relative movement between the driven element 236 and the body 234.

The Second Embodiment

Figure 4A:
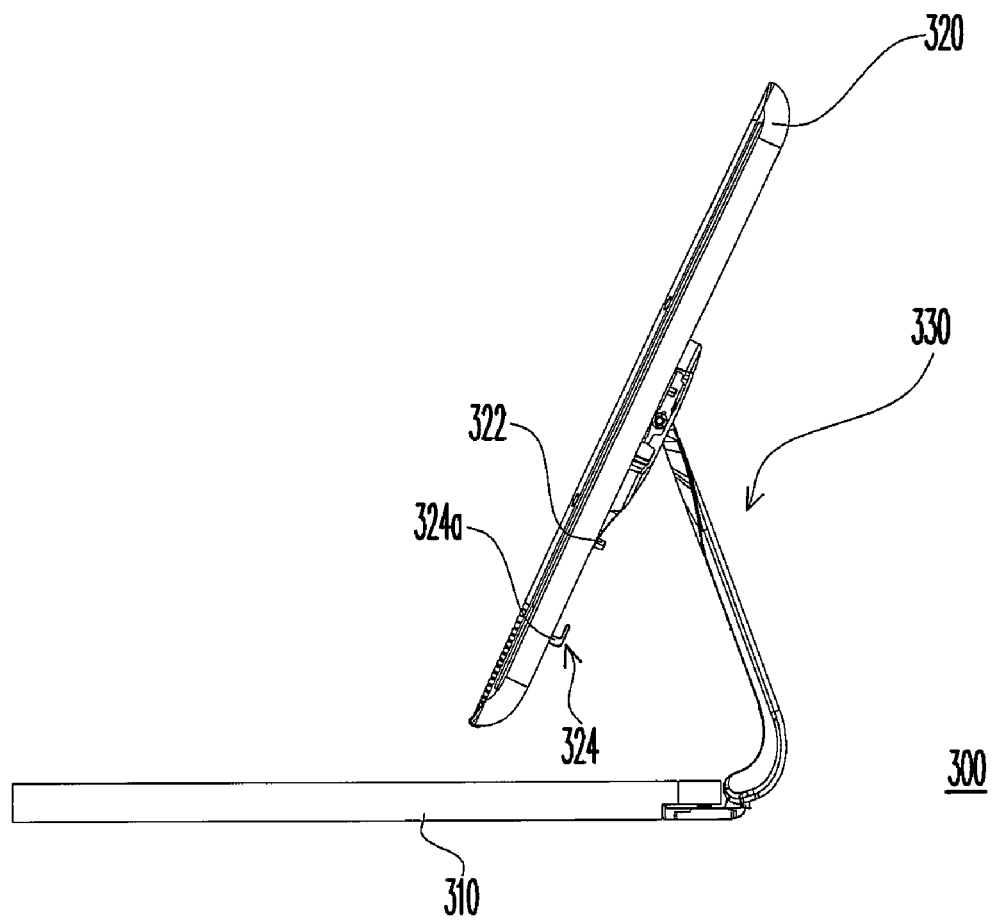
FIGS. 4A-4C are schematic side views of an electronic apparatus acting from the operation state to the folding state according a second embodiment of the present invention.
Figure 4B:
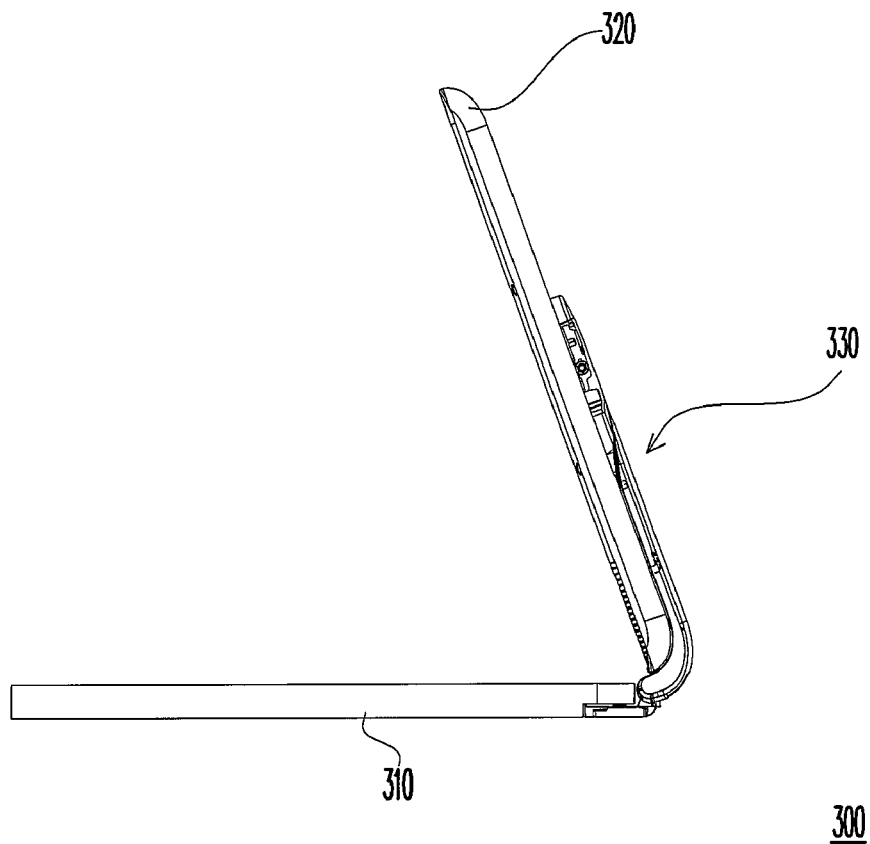
Figure 4C:
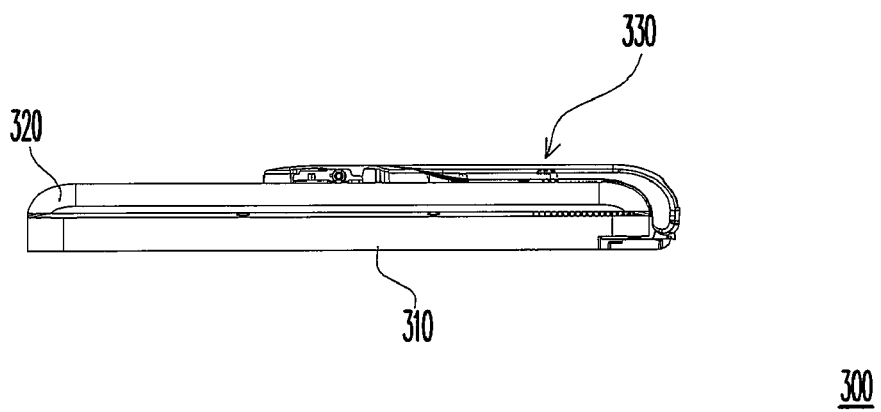

FIGS. 4A-4C are schematic side views of an electronic apparatus acting from the operation state to the folding state according a second embodiment of the present invention.

Figure 5A:
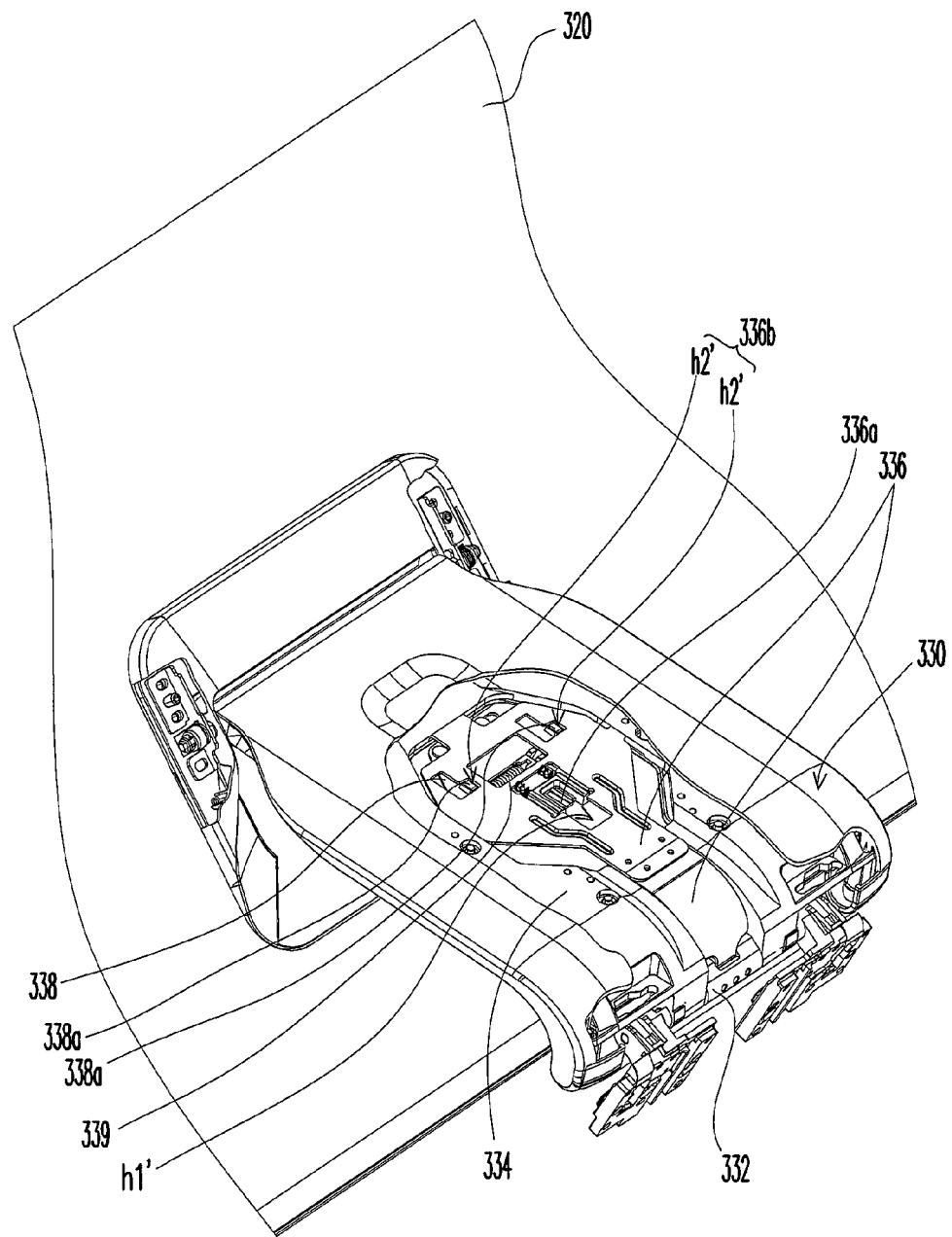
FIGS. 5A-5C are 3-D diagrams of the connection mechanism corresponding to the action of FIGS. 4A-4C, respectively.
Figure 5B:
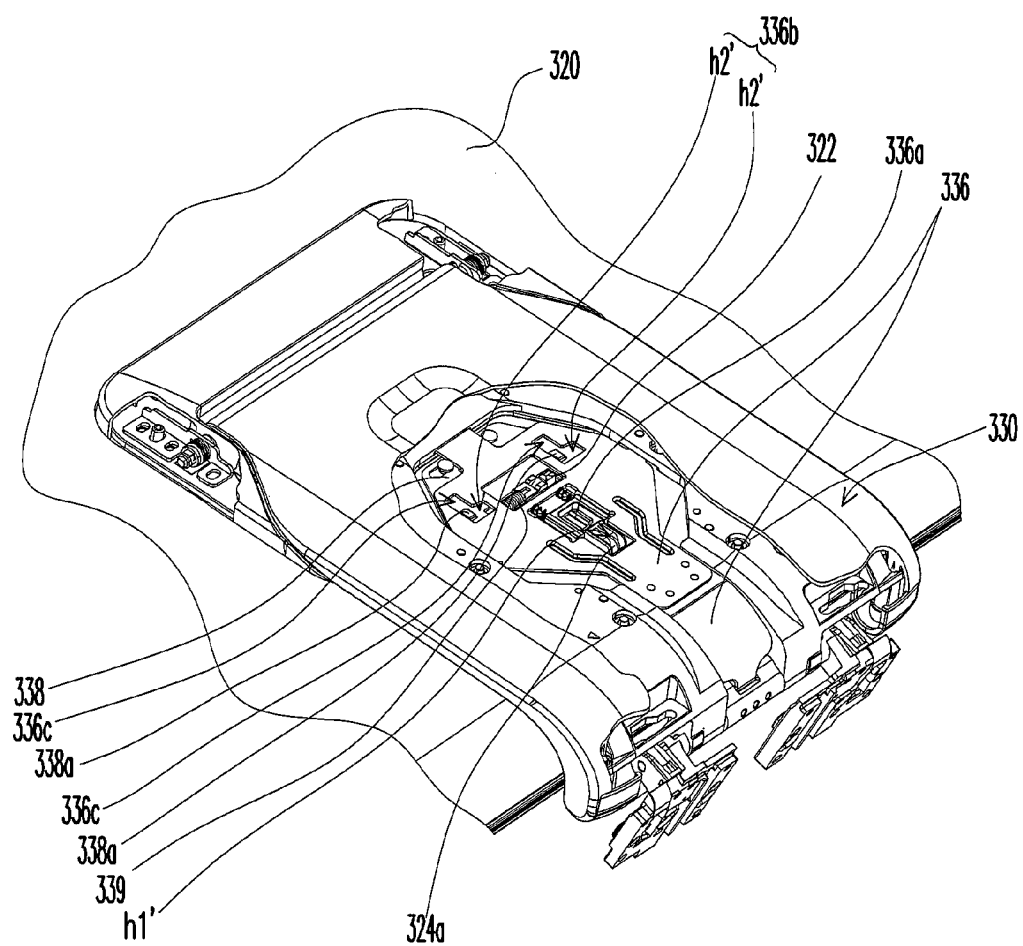
Figure 5C:
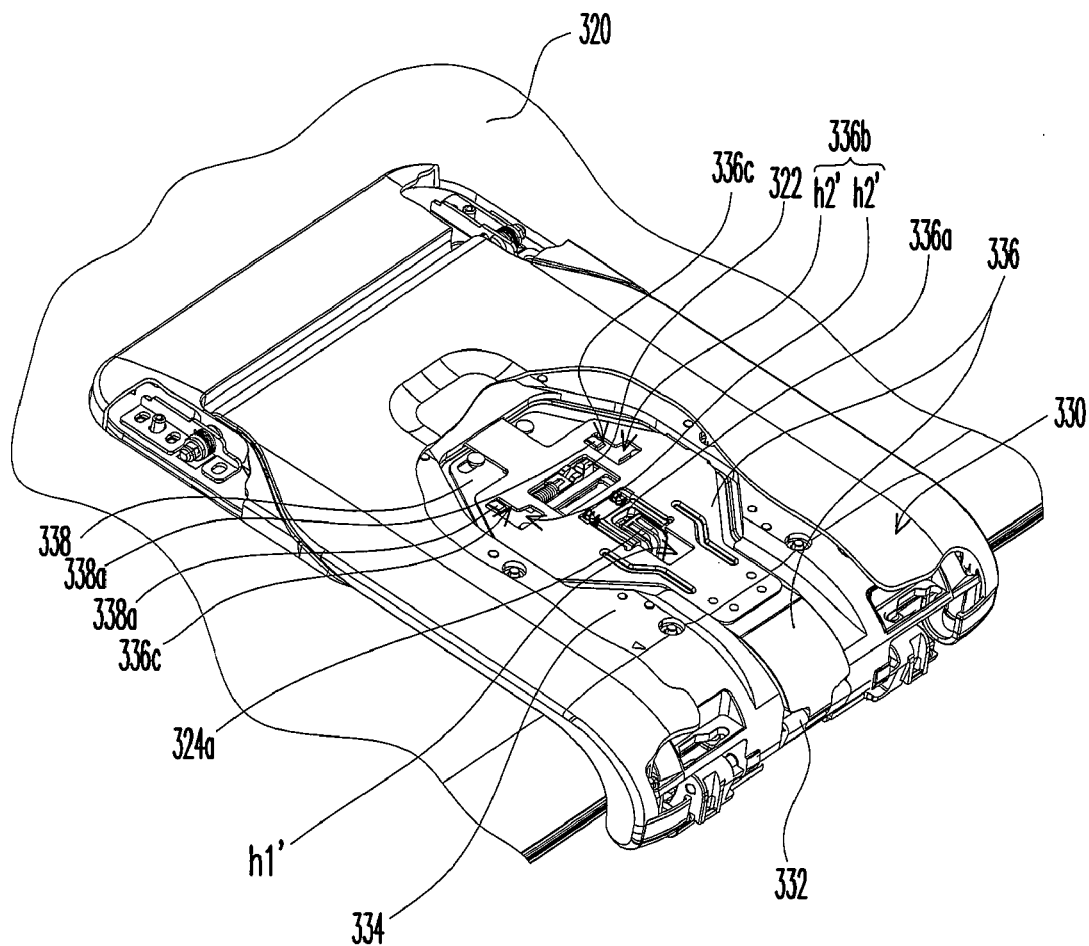
Figure 6:
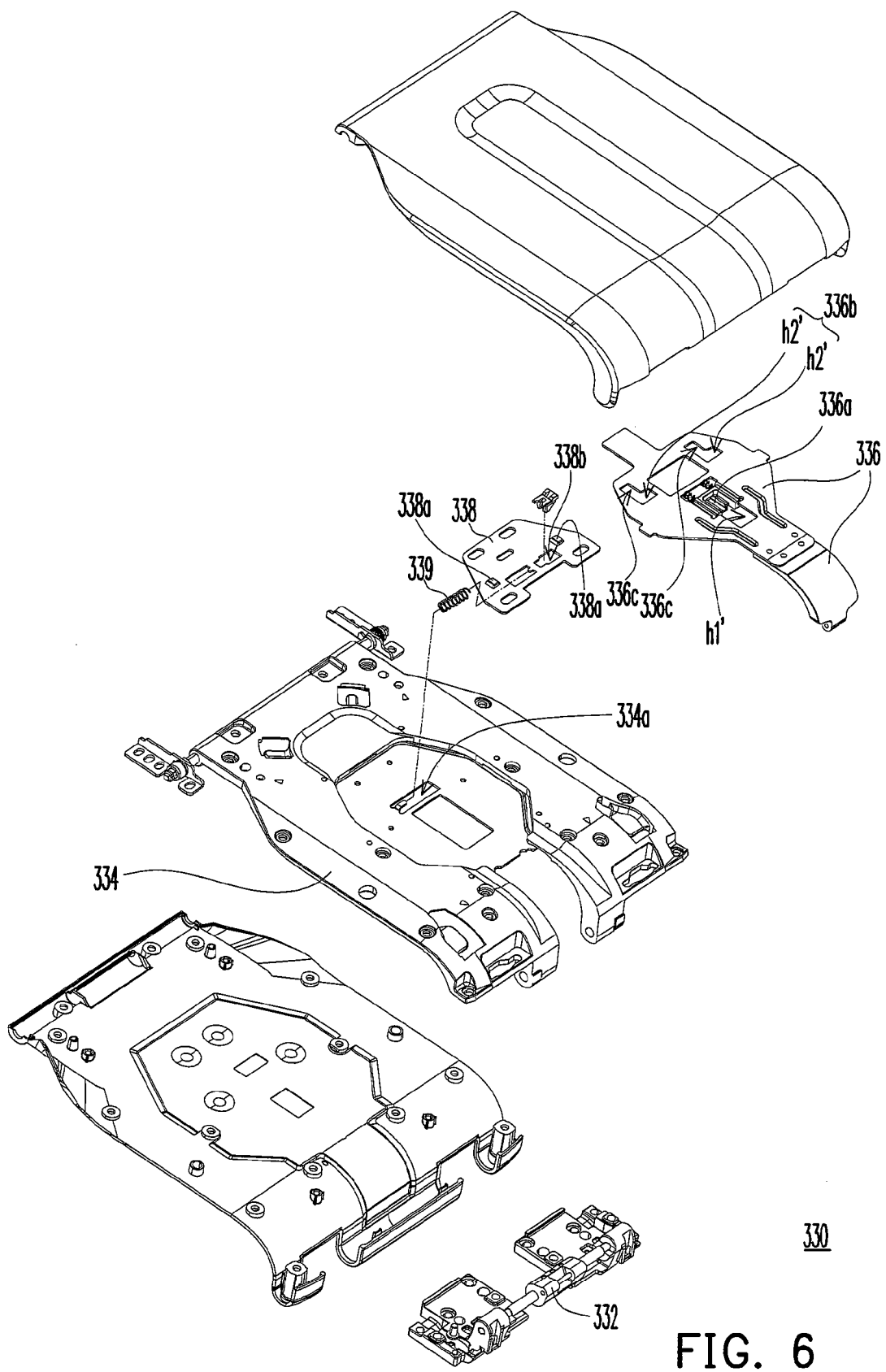
FIG. 6 is a 3-D exploded diagram showing the partial connection mechanism of FIG. 4A.

FIGS. 5A-5C are 3-D diagrams of the connection mechanism corresponding to the action of FIGS. 4A-4C, respectively. FIG. 6 is a 3-D exploded diagram showing the partial connection mechanism of FIG. 4A. Referring to FIGS. 4A, 5A and 6, the major difference of the electronic apparatus 300 in the second embodiment from the electronic apparatus 200 of the first embodiment lies in that the connection mechanism 330 further includes an elastic element 339 (for example, a spring) elastically disposed between the fourth locking part 338 and the body 334 such that the fourth locking part 338 moves relatively to the body 334. In addition, the fourth locking part 338 has a second opening 338b corresponding to the first opening 334a of the body 334. Furthermore, the shape of the driven element 336 is somehow different from that of the driven element 236 of the first embodiment.

The action of the electronic apparatus 300 from the operation state to the folding state is explained as follows. First, referring to FIGS. 4A, 5A and 6, when the second machine assembly 320 is located at a first position shown in FIG. 4A and the connection mechanism 330 is located at a second position shown in FIG. 4A (i.e. when the electronic apparatus 300 is in operation state), the second machine assembly 320 is located above the first machine assembly 310, the pushing part 322 and the first locking part 324 are far from the connection mechanism 330, and the fourth locking part 338 locks the third locking part 336b to restrict the relative movement between the driven element 336 and the body 334. In the embodiment, when the second machine assembly 320 is located at the first position and the connection mechanism 330 is located at the second position, the protrusions 338a of the fourth locking part 338 respectively lock the locking holes h2' of the third locking part 336b.

Next, referring to FIGS. 4B, 5B and 6, when the second machine assembly 320 rotates relatively to the connection mechanism 330 from the first position to the second position, the pushing part 222 interferes the connection mechanism 330 so that the third locking part 336b does not lock the fourth locking part 338. In the embodiment, when the second machine assembly 320 rotates relatively to the connection mechanism 330 from the first position to the second position, the pushing part 322 passes through the first opening 334a (shown in FIG. 6) of the body 334 and the second opening 338b (shown in FIG. 6) of the fourth locking part 338 to push the fourth locking part 338, such that the locking holes h2' of the third locking part 336b do not lock the protrusions 338a of the fourth locking part 338. In addition, the hook 324a of the first locking part 324 (shown in FIG. 4A) passes through the locking hole h1' (shown in FIG. 5A) of the second locking part 336a but does not lock the locking hole h1' of the second locking part 336a.

In more detail, the driven element 336 in the embodiment further has at least a guiding hole 336c, and the guiding holes 336c are integrally formed respectively with the locking holes h2' to form two L-shaped apertures. When the second machine assembly 220 rotates relatively to the connection mechanism 330 from the first position to the second position, the pushing part 222 pushes the fourth locking part 338 and presses the elastic element 339, so that the protrusions 338a of the fourth locking part 338 depart from the locking holes h2' of the third locking part 336b to be located in the guiding holes 336c.

After that, referring to FIGS. 4C, 5C and 6, when the second machine assembly 330 together rotate relatively to the first machine assembly 310 from the second position to a third position shown in FIG. 4C (i.e. when the second machine assembly 320 is folded to the first machine assembly 310), the eccentric element 332 drives the driven element 336 so that the driven element 336 rotate relatively to the eccentric element 332 and move relatively to the body 334 and the second locking part 336a locks the first locking part 324 (shown in FIG. 4A). In the embodiment, when the second machine assembly 320 and the connection mechanism 330 together rotate relatively to the first machine assembly 310 from the second position to the third position, the protrusions 338a of the fourth locking part 338 respectively move along the guiding holes 336c and the locking hole h1' of the second locking part 336a locks the hook 324a of the first locking part 324 (shown in FIG. 4A).

The action of the electronic apparatus 300 from the folding state to the operation state is explained as follows. First, referring to FIGS. 4C, 5C and 6, when the second machine assembly 320 and the connection mechanism 330 are together located at the third position shown in FIG. 4C (i.e. when the electronic apparatus 300 is in unfolding state), the locking hole h1' of the second locking part 336a locks the hook 324a of the first locking part 324 (FIG. 4A) and the pushing part 322 passes through the first opening 334a (FIG. 6) of the body 334 to interfere the connection mechanism 330 so that the locking holes h2' of the third locking part 336b do not lock the protrusions 338a of the fourth locking part 338.

Next, referring to FIGS. 4B, 5B and 6, when the second machine assembly 320 and the connection mechanism 330 together rotate relatively to the first machine assembly 310 from the third position to the second position (shown in FIG. 4B), the driven element 336 moves relatively to the body 334 and the hook 324a of the first locking part 324 (FIG. 4A) passes through the locking hole h1' (FIG. 5A) of the second locking part 336a but does not lock the locking hole h1' of the second locking part 336a.

After that, referring to FIGS. 4A, 5A and 6, when the second machine assembly 320 rotates relatively to the connection mechanism 330 from the second position to the first position shown in FIG. 1A (i.e. the electronic apparatus 300 is in operation state), the second machine assembly 320 is located above the first machine assembly 310, the pushing part 322 and the first locking part 324 are far from the connection mechanism 330 and the protrusions 338a of the fourth locking part 338 correspondingly lock the locking holes h2' of the third locking part 336b to restrict the relative movement between the driven element 336 and the body 334.

In summary, since the fourth locking part locks the third locking part to restrict the relative movement between the driven element and the body, therefore, the second machine assembly is be stably disposed above the first machine assembly by means of the connection mechanism when the electronic apparatus is in operation state. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic apparatus, comprising:
a first machine assembly;
a second machine assembly, having a pushing part and a first locking part; and
a connection mechanism, connecting the first machine assembly and the second machine assembly, comprising:
a body, wherein an end of the body is pivoted to the first machine assembly, and another end of the body is pivoted to the second machine assembly;

a driven element, movably disposed on the body and having a second locking part and a third locking part; and a fourth locking part, disposed on the body, wherein when the second machine assembly is located at a first position and the connection mechanism is located at a second position, the second machine assembly is located above the first machine assembly, the pushing part and the first locking part are far from the connection mechanism and the fourth locking part locks the third locking part to restrict the relative movement between the driven element and the body.

2. The electronic apparatus according to claim 1, wherein when the second machine assembly rotates relatively to the connection mechanism from the first position to the second position, the pushing part passes through the body to interfere the connection mechanism such that the third locking part does not lock the fourth locking part.

3. The electronic apparatus according to claim 2, wherein when the second machine assembly and the connection mechanism together rotate relatively to the first machine assembly from the second position to a third position, the driven element moves relatively to the body and the second locking part locks the first locking part.

4. The electronic apparatus according to claim 3, wherein the connection mechanism comprises:

an eccentric element, fixed to the first machine assembly, wherein the body is pivoted to the eccentric element, the body is suitable for rotating relatively to the eccentric element about a first axis, an end of the driven element is pivoted to the eccentric element, the driven element is suitable for rotating relatively to the eccentric element about a second axis, and the first axis is parallel to the second axis, wherein when the second machine assembly and the connection mechanism together rotate relatively to the first machine assembly from the second position to the third position, the eccentric element drives the driven element so that the driven element rotates relatively to the eccentric element and moves relatively to the body, and the second locking part locks the first locking part.

5. The electronic apparatus according to claim 4, wherein the connection mechanism comprises:

a first pivot, passing through the eccentric element and the body, wherein the eccentric element is fixed to the first pivot, the first pivot is fixed to the first machine assembly and the first axis passes through the first pivot; and a second pivot, passing through the eccentric element and the driven element, wherein the second pivot is fixed to the eccentric element and the second axis passes through the second pivot.

6. The electronic apparatus according to claim 3, wherein the first locking part has a hook and the second locking part has a locking hole.

7. The electronic apparatus according to claim 4, wherein the driven element comprises:

a first driven part, having the second locking part, wherein an end of the first driven part is pivoted to the eccentric element;

a second driven part, having the third locking part, wherein the second driven part is pivoted to another end of the first driven part far from the second axis; and a torsion spring, pivotally disposed at the first driven part and exerting a torque relatively to the first driven part on the second driven part, wherein when the second machine assembly rotates relatively to the connection mechanism from the first position to the second position, the pushing part passes through the body to push the second driven part, and the second driven part rotates relatively to the first driven part against the direction of the torque such that the third locking part does not lock the fourth locking part.

8. The electronic apparatus according to claim 2, wherein the connection mechanism comprises an elastic element elastically disposed between the fourth locking part and the body, and when the second machine assembly rotates relatively to the connection mechanism from the first position to the second position, the pushing part passes through the body and the fourth locking part to push the fourth locking part such that the third locking part does not lock the fourth locking part.

9. The electronic apparatus according to claim 1, wherein when the connection mechanism is located at the second position, an included angle between the connection mechanism and the first machine assembly ranges between 70° and 90°.

10. The electronic apparatus according to claim 1, wherein the fourth locking part has a protrusion and the third locking part has a locking hole.

11. An electronic apparatus, comprising:

a first machine assembly;

a second machine assembly, having a pushing part and a first locking part; and a connection mechanism, connecting the first machine assembly and the second machine assembly, comprising:

a body, wherein an end of the body is pivoted to the first machine assembly, while another end of the body is pivoted to the second machine assembly;

a driven element, movably disposed on the body and having a second locking part and a third locking part; and a fourth locking part, disposed on the body, wherein when the second machine assembly and the connection mechanism are together located at a first position, the first locking part locks the second locking part, and the pushing part passes through the body to interfere the connection mechanism such that the third locking part does not lock the fourth locking part;

when the second machine assembly and the connection mechanism together rotate relatively to the first machine assembly from the first position to a second position, the driven element moves relatively to the body and the second locking part does not lock the first locking part.

12. The electronic apparatus according to claim 11, wherein the connection mechanism comprises:

an eccentric element, fixed to the first machine assembly, wherein the body is pivoted to the eccentric element, the body is suitable for rotating relatively to the eccentric element about a first axis, an end of the driven element is pivoted to the eccentric element, the driven element is suitable for rotating relatively to the eccentric element about a second axis, and the first axis is parallel to the second axis, wherein when the second machine assembly and the connection mechanism together rotate relatively to the first machine assembly from the first position to the second position, the eccentric element drives the driven element so that the driven element rotates relatively to the eccentric element and moves relatively to the body, and the second locking part does not lock the first locking part.

13. The electronic apparatus according to claim 12, wherein the connection mechanism comprises:

a first pivot, passing through the eccentric element and the body, wherein the eccentric element is fixed to the first pivot, the first pivot is fixed to the first machine assembly and the first axis passes through the first pivot; and a second pivot, passing through the eccentric element and the driven element, wherein the second pivot is fixed to the eccentric element and the second axis passes through the second pivot.

14. The electronic apparatus according to claim 11, wherein the first locking part has a hook and the second locking part has a locking hole.

15. The electronic apparatus according to claim 11, wherein when the connection mechanism is located at the second position, an included angle between the connection mechanism and the first machine assembly ranges between 70° and 90°.

16. An electronic apparatus, comprising:
a first machine assembly;
a second machine assembly, having a first locking part; and
a connection mechanism, connecting the first machine assembly and the second machine assembly and having a second locking part, wherein the second machine assembly is pivoted to the connection mechanism and the connection mechanism is pivoted to the first machine assembly, wherein when the second machine assembly and the connection mechanism are together located at a first position, the first locking part locks the second locking part;

when the second machine assembly and the connection mechanism together rotate relatively to the first machine assembly from the first position to a second position, the second locking part does not lock the first locking part.

* * * * *